United States Patent
Mae et al.

(10) Patent No.: US 7,304,566 B2
(45) Date of Patent: Dec. 4, 2007

(54) COLLISION DETECTION SENSOR FOR VEHICLE AND COLLISION DETECTION DEVICE FOR VEHICLE

(75) Inventors: Hiroyuki Mae, Shioya-gun (JP); Takahiro Kamei, Utsunomiya (JP); Shigeo Tobaru, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 10/996,622

(22) Filed: Nov. 12, 2004

(65) Prior Publication Data

US 2005/0104721 A1 May 19, 2005

(30) Foreign Application Priority Data

Nov. 19, 2003 (JP) .............................. 2003-389017
Nov. 19, 2003 (JP) .............................. 2003-389167

(51) Int. Cl.
*B60Q 1/00* (2006.01)
(52) U.S. Cl. ..................... 340/436; 340/665; 280/734
(58) Field of Classification Search ................ 340/436, 340/438, 665, 661; 280/734, 735
See application file for complete search history.

(56) References Cited

U.S. PATENT DOCUMENTS 4,995,639 A * 2/1991 Breed .......................... 280/735
5,445,412 A * 8/1995 Gillis et al. ................ 280/735
6,204,756 B1 * 3/2001 Senyk et al. ............... 340/438
6,929,282 B1 * 8/2005 Zoratti et al. .............. 380/735

FOREIGN PATENT DOCUMENTS

| DE | 28 31 939 | 7/1978 |
| DE | 34 23 321 | 6/1984 |
| DE | 694 20 914 | 7/1994 |
| DE | 197 50 671 | 11/1997 |
| DE | 198 26 485 | 6/1998 |
| DE | 198 35 561 | 8/1998 |
| DE | 100 02 110 | 1/2000 |
| EP | 0 893 309 | 1/1999 |
| JP | 8-509934 | 10/1996 |
| WO | WO 95/24329 | 9/1995 |

* cited by examiner

*Primary Examiner*—Phung T. Nguyen
(74) *Attorney, Agent, or Firm*—Hamre, Schumann Mueller & Larson, PC

(57) ABSTRACT

A collision detection sensor for a vehicle of the present invention includes a single piezoelectric film which is flat, plural pairs of electrodes which sandwich the piezoelectric film and measure voltages between the electrodes, and spaces provided between the plural pairs of electrodes.

5 Claims, 3 Drawing Sheets

COLLISION DETECTION SENSOR FOR VEHICLE AND COLLISION DETECTION DEVICE FOR VEHICLE

BACKGROUND OF THE INVENTION

Priority is claimed on Japanese Patent Application No. 2003-389167, filed Nov. 19, 2003, and Japanese Patent Application No. 2003-389017, filed Nov. 19, 2003, the contents of which are incorporated herein by reference.

1. Field of the Invention

The present invention relates to a collision detection sensor for vehicles and a collision detection device for vehicles which detect the collision of vehicles.

2. Description of Related Art

As a technology concerning a collision detection sensor for a vehicle (or a collision detection device for a vehicle) which detects collision of vehicles, there is one having many sensor elements equipped with a piezoelectric film formed in the shape of a hexagon, and the sensor elements are so as to be flat by arranging them continuously (for example, refer to Published Japanese Translation No. H08-509934 of the PCT International Application). In such a collision detection sensor for a vehicle, each sensor element is equipped with a pair of electrodes which is arranged so that the electrodes sandwich a piezoelectric film therebetween to detect voltages, and the location and magnitude of a collision are detected from the voltage measured by each sensor element.

However, the above-mentioned conventional collision detection sensor for a vehicle (or collision detection equipment for vehicles) has a problem in that manufacturing cost is high since the piezoelectric film formed in the shape of a hexagon needs to be arranged continuously so that the arrangement is flat, and the each piezoelectric film arranged continuously so as to be flat needs to be equipped with the pair of electrodes for measuring voltages. In addition, in the case in which temperature compensations or failure judgments are performed, other sensors such as a temperature sensor become necessary, and this point is also the cause of problems that increase manufacturing cost.

The present invention was made in view of the above-mentioned situations, and has objects of providing a collision detection sensor for a vehicle and a collision detection device for a vehicle, which can reduce manufacturing cost.

SUMMARY OF THE INVENTION

In order to achieve the above-mentioned objects, the present invention adopted the following.

That is, a collision detection sensor for a vehicle of the present invention includes: a single piezoelectric film which is flat; plural pairs of electrodes which sandwich the piezoelectric film and measure voltages between the electrodes; and spaces provided between the plural pairs of electrodes.

According to the collision detection sensor for a vehicle, since the plural pairs of electrodes are provided on the piezoelectric film which is flat with a space between each pair of electrodes, in addition to the pressure applied on a location at which the pair of electrodes are provided, the pressure applied on a location at which the pair of electrodes is not provided can also be detected by the pair of electrodes which is located at a position which is away from a compressed part on the piezoelectric film, by the stress transferring from the compressed part along the surface of the piezoelectric film. Then, by analyzing the voltage of each pair of electrodes immediately and completely, it is possible to determine the type of collision and the magnitude of collision force and to make a judgment of collision for specifying the type of collision. Based on the judgment of collision, it is possible to make suitable selection of safety devices for collision that should be activated. Therefore, since it is not necessary to provide many piezoelectric films in order, and since the number of the pairs of electrodes can be reduced, manufacturing cost can be reduced.

Three or more pairs of the electrodes may be provided on the same straight line.

In this case, detection accuracy can be improved. Therefore, the type of collision and the magnitude of collision force can be detected more accurately, and the judgment of collision for specifying the type of collision can be made more accurately, and thus it is possible to select suitable devices that should be operated more appropriately.

The collision detection sensor for a vehicle may be provided in the front bumper face of vehicles, and may serve both as a collision detection sensor for detecting a collision with a pedestrian and a collision detection sensor for controlling operation of an air bag.

In this case, since the collision detection sensor for a vehicle serves both as the collision detection sensor for detecting a collision with a pedestrian and the collision detection sensor for controlling operation of an air bag, manufacturing cost can be further reduced. In addition, since the collision detection sensor for a vehicle is provided in the front bumper face, in the early stages of collision which is before the body frame of the vehicle deforms, it is possible to determine the type of collision and the magnitude of collision force, and to make the judgment of collision for specifying the type of collision.

Therefore, it is possible to select suitable devices that should be operated and to activate the suitable devices at an early stage.

A collision detection device for a vehicle of the present invention includes: a collision detection sensor for a vehicle which includes a single piezoelectric film which is flat, a plurality of pairs of electrodes which sandwich the piezoelectric film and measure voltages between the electrodes, and spaces provided between the plural pairs of electrodes; and a controller which detects collision of a vehicle based on detected results by the collision detection sensor for a vehicle; wherein in a state in which a predetermined voltage is applied to one of the pairs of electrodes on the piezoelectric film, the controller performs at least one of temperature compensation and failure judgment based on detected results by another pair of electrodes which is different from above-mentioned one of the pairs of electrodes.

According to the collision detection device for a vehicle, since it includes the collision detection sensor for a vehicle having the plural pairs of electrodes which are provided with a space between them on the piezoelectric film which is flat, in addition to the pressure applied at a location at which the pair of electrodes are provided, the pressure applied on a location at which the pair of electrodes is not provided can also be detected by the pair of electrodes which is located away from a compressed part on the piezoelectric film, by the stress transferring from the compressed part along the surface of the piezoelectric film. Then, by analyzing the voltage of each pair of electrodes immediately and completely, it is possible to determine the type of collision and the magnitude of collision force and to make a judgment of collision for specifying the type of collision. Based on the judgment of collision, it is possible to make suitable selection of safety devices for collision that should be activated. Therefore, since it is not necessary to provide many piezoelectric films in order, and since the number of the pair of electrodes can be reduced, manufacturing cost can be reduced. In addition, in a state in which the controller applies the predetermined voltage to one of the pairs of electrodes on the piezoelectric film, a local deformation is produced on the piezoelectric film, and a stress caused by the local deformation is transferred along the surface of the piezoelectric film, and the stress can be detected by another pair of electrodes located away from the above-mentioned one of the pairs of electrodes. Furthermore, since the voltage measured by the above-mentioned another pair of electrodes varies depending on the temperature, in contrast, it is possible to estimate the temperature based on the voltage measured by the above-mentioned another pair of electrodes, and to perform temperature compensation based on the estimated temperature. In addition, since the voltage measured by the above-mentioned another pair of electrodes should be held within a predetermined range, it is possible to make a failure judgment (whether the condition is normal or abnormal) based on the voltage whether it is held within the predetermined range or not. Therefore, also in the point that at least one of the temperature compensation and the failure judgment can be performed without using other sensors such as a temperature sensor, it can be said that the manufacturing cost can be reduced.

DETAILED DESCRIPTION OF THE INVENTION

FIRST EMBODIMENT

A first embodiment of a collision detection sensor for a vehicle and a collision detection device for a vehicle according to the present invention will be explained below with reference to the figures.

Figure 1:
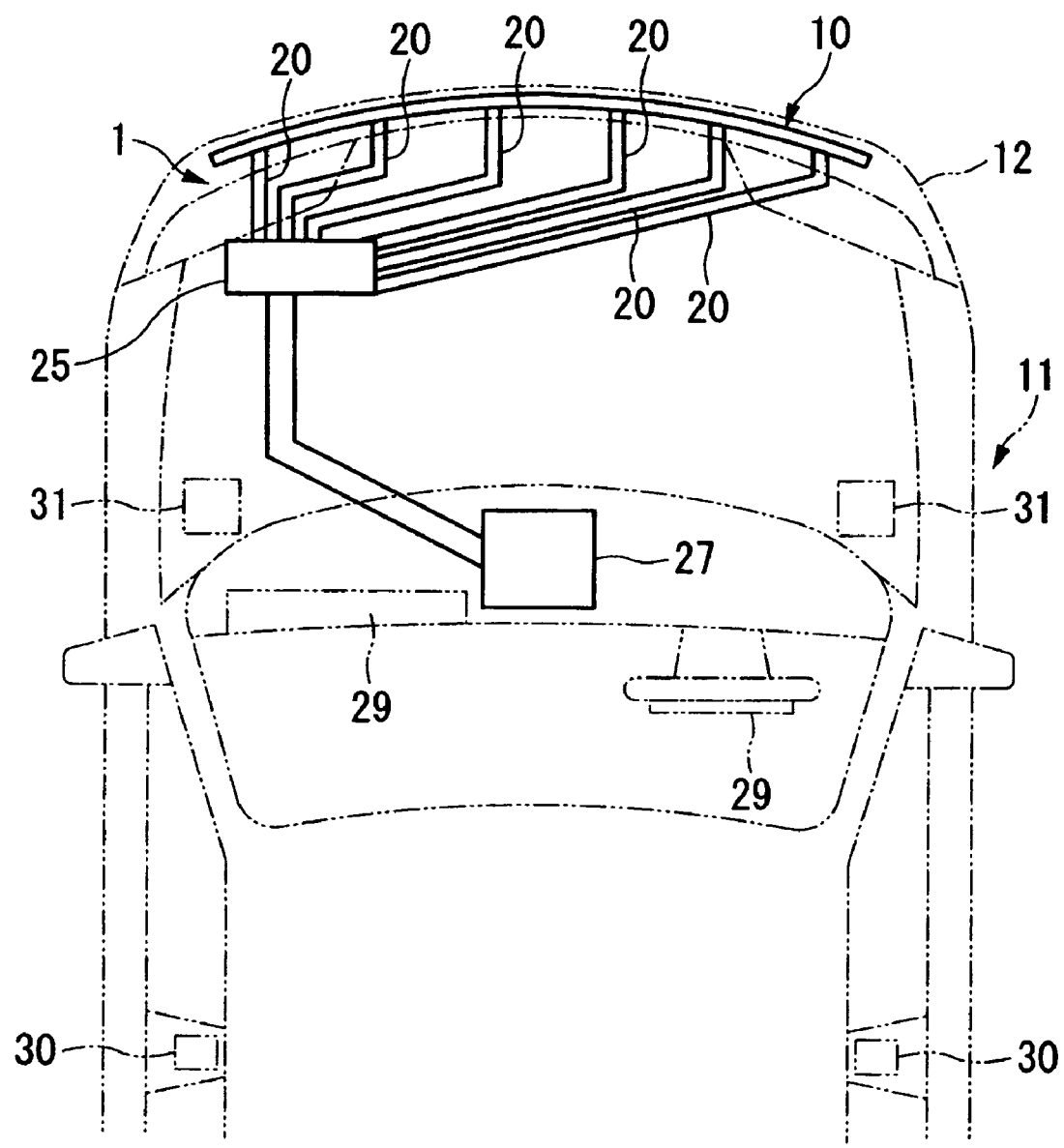
FIG. 1 is a plan view schematically showing a front part of a vehicle equipped with a collision detection sensor for a vehicle (collision detection device for a vehicle) of a first embodiment of the present invention.

As shown in FIG. 1, a collision detection sensor for a vehicle (a collision detection sensor for a vehicle) 10 used in a collision detection device 1 for vehicles of the present embodiment is provided near the outer surface of a vehicle 11, and is used for detecting an input from the outside to vehicles 11, i.e., a collision. Specifically, the collision detection sensor for a vehicle 10 is provided on an inner surface of the front bumper face 12, and primarily detects a front collision.

Figure 2:
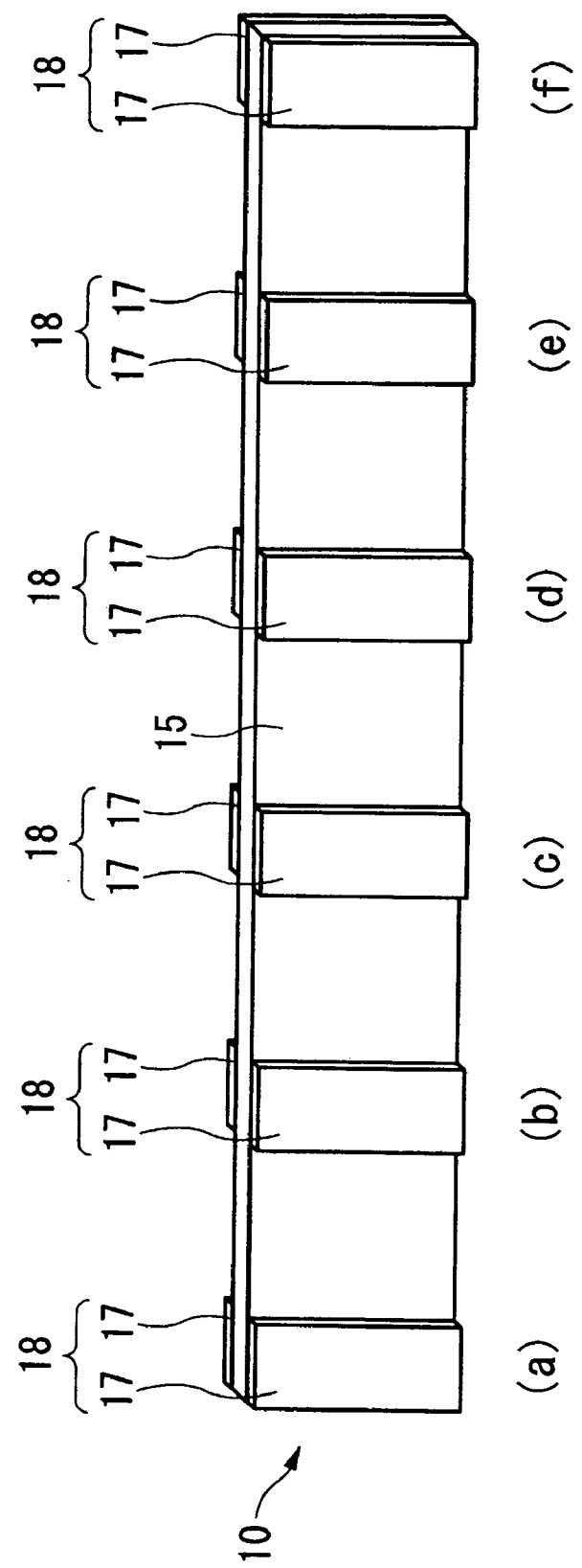
FIG. 2 is a perspective view of the collision detection sensor for a vehicle.

The collision detection sensor for a vehicle 10 is equipped with a piezoelectric film 15 which continuously extends along a plane as shown in FIG. 2. The piezoelectric film 15 is made of a macromolecular compound, and produces electrical charge when deformed, and conversely, deforms when electrical charge is applied.

Moreover, the collision detection sensor for a vehicle 10 includes electrode units 18 each having a pair of electrodes 17 which are arranged so that they sandwich the piezoelectric film 15 from both sides in the thickness direction of the piezoelectric film in a condition such that the positions of the electrodes 17 are matched with each other, and each of the electrode units 18 detects the electrical charge produced in the piezoelectric film 15 as voltages. Plural above-mentioned electrode units 18 are provided on one piezoelectric film 15 with predetermined spaces therebetween.

The piezoelectric film 15 has a rectangular shape extending along the horizontal direction, and three or more (six in the example shown in FIG. 2) of the electrode units 18 are provided along the length direction. That is, three or more of the electrode units 18 are provided on the same straight line with predetermined spaces between them. The electrode units 18 are provided at both end portions and a middle portion in the length direction of the piezoelectric film 15, and are arranged so that predetermined spaces are provided between them.

The electrodes 17 of each of the electrode units 18 are made of thin films formed in a rectangular shape, or a metal paste, or a vapor deposited metal. Furthermore, the electrodes 17 are pasted or painted or vapor deposited on the piezoelectric film 15 so that it extends towards the total width thereof. A wire 20 shown in FIG. 1 is connected to each of the electrodes 17.

The above-mentioned collision detection sensor for a vehicle 10 of the present embodiment is, although not shown in the figures, directly installed on an inner surface of the front bumper face 12 in a state such that the collision detection sensor for a vehicle 10 is completely covered with a pouch-shaped covering member made of, for example, an insulation material; otherwise, the collision detection sensor for a vehicle 10 may be installed on the inner surface of the front bumper face 12 via a supporting plate made of a synthetic resin material, etc. The state of the installed collision detection sensor for a vehicle 10 will be in a position in which the length direction of the piezoelectric film 15 conforms to the width direction of the vehicle 11 so that the plural electrode units 18 are aligned in the width direction of the vehicle 11, and the width direction of the piezoelectric film 15 conforms to the vertical direction.

The wires 20 of each of the electrode units 18 of the collision detection sensor for a vehicle 10 are connected to a signal conditioner 25 located in an engine compartment. The signal conditioner 25 transfers electrical signals from each of the electrode units 18 to a SRS (Supplemental Restraint System) control unit (controller) 27 after processing the electrical signals to increase signal intensity and to reduce noise, etc. The above-mentioned collision detection device for a vehicle 1 is composed of the collision detection sensor for a vehicle 10, the signal conditioner 25, and the SRS control unit 27.

The SRS control unit 27 judges the type of collision and the magnitude of collision force, etc., based on the voltages measured by each electrode unit 18. On the other hand, an air bag device 29 which expands an air bag, a seat belt winding device 30 which winds a seat belt forcibly, and an engine hood lifting device 31 which lifts up an engine hood forcibly, are provided on the vehicle 11 as safety devices for collision. Furthermore, based on measurement data of the collision detection sensor for a vehicle 10, speed data measured by a speed sensor, which is not shown in figures, etc., the SRS control unit 27 makes a judgment as to whether the vehicle 11 collided with a pedestrian or with an object, and then controls the operations of the air bag device 29, seat belt winding device 30, and engine hood lifting device 31.

In the early stages of a collision, based on signals of each electrode unit 18, the SRS control unit 27 estimates whether the type of collision is a full lap collision or a pole collision or an offset collision, and furthermore, in the case in which the collision is estimated as being an offset collision, the SRS control unit 27 also estimates whether the direction of offset is left or right and further estimates the degree of offset and the severity of the collision. Then the SRS control unit 27 makes judgments about the type of collision and the severity of the collision using a G sensor (accelerometer) or a satellite G sensor in the SRS control unit 27. Corresponding to the judgment results of the type of collision and the severity of the collision, the SRS control unit 27 controls each operation of the air bag device 29, the seat belt winding device 30, and the engine hood lifting device 31.

Figure 3:
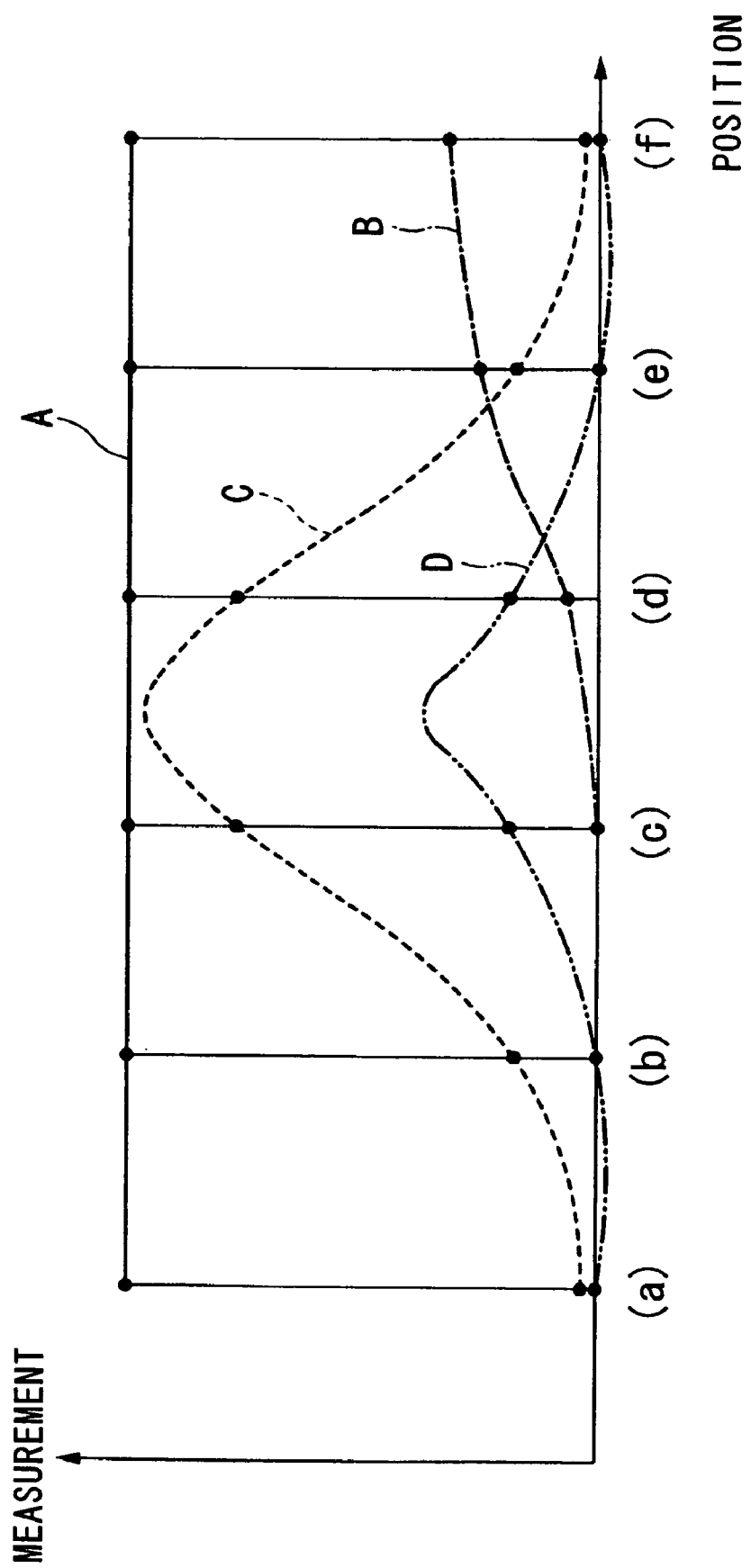
FIG. 3 is a characteristics diagram showing the output characteristics of the collision detection sensor for a vehicle, for various collision patterns.

For example, as shown in FIG. 3, when the positions of each electrode unit 18 arranged in the car width direction (positions (a) to (f) shown in FIG. 3 correspond to positions (a) to (f) shown in FIG. 2) are taken as a horizontal axis, and when the measurement of each electrode unit 18 at each position is taken as a vertical axis, in the case in which the vehicle 11 collides with a flat and hard wall which has a broad surface area and is at a fixed location, the measurements of the electrode units 18 become almost equal and are high values. In this case, estimated values at each point between each of the electrode units 18 can be obtained by drawing a line which smoothly connects the measurements. In this case, as shown by a solid line A in FIG. 3, estimated values at each point between each of the electrode units 18 can be estimated so that they will have the same values as the measurements. In the case in which this kind of data is obtained, the SRS control unit 27 judges that the collision is with something other than a pedestrian, and also judges that the collision is classified to be in a destruction mode. Then, in order to protect passengers, the SRS control unit 27 winds the seat belts by the seat belt winding device 30 at a predetermined timing, and also activates the air bag device 29 at a predetermined timing. That is, the collision detection sensor for a vehicle 10 works as a collision detection sensor which controls operation of an air bag.

In the case in which the vehicle 11 collides with a soft object which is fixed at a fixed location, with an offset in the car width direction, the measurements at each electrode unit 18 will be higher toward the electrode units 18 on the collided side, and will be lower toward the non-collided side, as indicated by a chain line B in FIG. 3 Also in this case, by drawing a smooth curve, estimated values at each point between each of the electrode units 18 can be obtained, and furthermore, maximum value of the measurement which indicates a collision force and a occurring position thereof can be estimated. In this case, it can be understood that the maximum value of the measurements occurred at one end portion in the car width direction, and furthermore, that the measurement values become relatively lower, and that the occurring position spreads relatively broad. Also in this case, the SRS control unit 27 judges that the collision is with something other than a pedestrian, and also judges that the collision is classified to be in a destruction mode. Then, in order to protect passengers, the SRS control unit 27 winds the seat belts by the seat belt winding device 30 at a predetermined timing, and also activates the air bag device 29 at a predetermined timing.

Furthermore, in the case in which the vehicle 11 collides at its middle of a front face in the car width direction with a hard object, such as a telegraph pole, which has small surface area and is fixed at a fixed location, the measurements at each electrode unit 18 will be higher toward the electrode units 18 on the collided side, and will be lower toward the both end sides in the car width direction, as indicated by a chain line C in FIG. 3. Also in this case, by drawing a smooth curve, estimated values at each point between each of the electrode units 18 can be obtained, and furthermore, a maximum value of the measurements which indicates a collision force and a position thereof can be estimated. In this case, it can be understood that the maximum value of the measurements occurring at the center position in the car width direction where the electrode unit 18 is not arranged, and furthermore, that the measurement values become relatively higher. Also, in the case in which this kind of data is obtained, the SRS control unit 27 judges that the collision is with something other than a pedestrian, and also judges that the collision is classified to be in a destruction mode. Then, in order to protect passengers, the SRS control unit 27 winds the seat belts by the seat belt winding device 30 at a predetermined timing, and also activates the air bag device 29 at a predetermined timing.

Moreover, based on the maximum value of the above-mentioned measurements which indicates the collision force, it is possible to judge that the collision is not classified to be in a destruction mode, but is classified to be in a non-destruction mode, for example, such as a collision with a curb stone. In the case in which the collision is in the non-destruction mode, the SRS control unit 27 controls so that, for example, the air bag device 29 will not be activated.

In the case in which the vehicle 11 collides at its middle of a front face in the car width direction with a pedestrian, the measurements at each electrode unit 18 will be higher toward the electrode units 18 on the collided side, and will be lower toward the two end sides in the car width direction, as indicated by a chain line D in FIG. 3. Also in this case, by drawing a smooth curve, estimated values at each point between each of the electrode units 18 can be obtained, and furthermore, maximum value of the measurements which indicates a collision force and a position thereof can be estimated. Also in this case, it can be understood that the maximum value of the measurements occurs at the center position in the car width direction where the electrode unit 18 is not arranged, and furthermore, that the measurement values become relatively lower, and that the occurring region of the measurements becomes a relatively narrower region. In the case in which this kind of data is obtained, the SRS control unit 27 judges that the collision is with a pedestrian; then, in order to protect the pedestrian, the SRS control unit 27 makes controls such as lifting up the engine hood by activating the engine hood lifting device 31 at the predetermined timing. That is, the collision detection sensor for a vehicle 10 of the present invention also works as a collision detection sensor for detecting a collision with a pedestrian.

According to the above-mentioned collision detection device for a vehicle 10 of the present invention, since the plurality of electrode units 18 is provided on one piezoelectric film 15 which is flat, with a space therebetween, in addition to the pressure applied on a location at which the electrode units 18 are provided, the pressure applied on a location at which the electrode units 18 is not provided can also be detected by the electrode units 18 which is located away from a compressed part on the piezoelectric film 15, by the stress transferring from the compressed part along the surface of the piezoelectric film 15. Then, by analyzing the voltage of each pair of electrodes immediately and completely, it is possible to determine the type of collision and the magnitude of collision force and to make a judgment of on the collision to specify the type of collision. Based on the judgment of collision, it is possible to make a suitable selection of safety devices for collision that should be activated. Therefore, since it is not necessary to provide many piezoelectric films 15 in order, and since the number of the electrode units 18 can be reduced, manufacturing cost can be reduced.

In addition, since more than three electrode units 18 are provided on the almost the same straight line, detection accuracy can be improved. Therefore, the type of collision and the magnitude of collision force can be detected more accurately, and the judgment of collision for specifying the type of collision can be made more accurately, and thus it is possible to select suitable devices that should be activated more appropriately.

In addition, since the collision detection sensor for a vehicle 10 of the present invention can serve both as a collision detection sensor for detecting a collision with a pedestrian and a collision detection sensor for controlling operation of the air bag, manufacturing cost can be further reduced. In addition, since the collision detection sensor for a vehicle 10 is provided in the front bumper face 12, in the early stages of collision which is before the deformation of a body frame of the vehicle deforms, it is possible to determine the type of collision and the magnitude of collision force, and to make a determination on the collision to determine the type of collision. Therefore, it is possible to select suitable devices that should be activated and to activate the suitable devices at an early stage.

SECOND EMBODIMENT

A second embodiment of a collision detection sensor for a vehicle and a collision detection device for a vehicle according to the present invention will be explained below. Moreover, the same reference symbols will be applied to the same components explained in the above-mentioned first embodiment, and explanations thereof are omitted.

In a state in which a predetermined voltage is applied to one of the electrode units 18 on the piezoelectric film 15, the SRS control unit 27 of the present invention performs temperature compensation and failure judgment based on detected results by another electrode unit 18 which is different from the above-mentioned one electrode unit 18.

Specifically, the SRS control unit 27 uses one of the electrode units 18 as an electrode unit 18 for applying temperature compensation voltage, and applies a predetermined voltage to the electrode unit 18 for applying temperature compensation voltage, at a timing, for example, when an ignition key is turned on and thereafter at a predetermined time interval. Furthermore, for each timing, the SRS control unit 27 uses one of the electrode units 18 which is, for example, adjacent to the electrode unit 18 for applying temperature compensation voltage as an electrode unit 18 for measuring temperature compensation voltage, and the SRS control unit 27 measures voltage by the electrode unit 18 for measuring temperature compensation voltage. That is, when the predetermined voltage is applied to the piezoelectric film 15 via the electrode unit 18 for applying temperature compensation voltage, a local deformation is produced in the piezoelectric film 15, and a stress caused by the local deformation of the piezoelectric film 15 is transferred along the surface of the piezoelectric film 15 and produces stress at the position of the electrode unit 18 for measuring temperature compensation voltage which is away from the electrode unit 18 for applying temperature compensation voltage, and then the stress produces the voltage which is measurable by this electrode unit 18 for measuring temperature compensation voltage.

The voltage measured by the electrode unit 18 for measuring temperature compensation voltage changes depending on the temperature, that is, the voltage increases as the temperature increases, while the voltage decreases as the temperature decreases. The SRS control unit 27 stores a table which defines the relationship between temperature and voltage to be measured by the electrode unit 18 for measuring temperature compensation voltage when the predetermined voltage is applied to the electrode unit 18 for applying temperature compensation voltage. Furthermore, the SRS control unit 27 estimates the temperature based on the voltage measured by the electrode unit 18 for measuring temperature compensation voltage with reference to the table. In addition, the SRS control unit 27 stores a table which defines corrections of the measurements for each temperature, and when calculating the above-mentioned measurements, the above-mentioned measurements are corrected by the correction which is estimated based on the temperature. As explained above, in a state in which the predetermined voltage is applied to the piezoelectric film 15 via the electrode unit 18 for applying temperature compensation voltage, temperature compensation is made based on the measurement result of the electrode unit 18 for measuring temperature compensation voltage which is different from the electrode unit 18 for applying temperature compensation voltage. Then, a judgment of the above-mentioned type of collision and the magnitude of collision force will be made based on the measurements which were corrected by the above-mentioned temperature compensation.

Furthermore, the SRS control unit 27 selects one predetermined electrode unit 18 as an electrode unit for applying voltage for failure judgment 18, and applies predetermined voltage on the electrode unit for applying voltage for failure judgment 18, at a timing, for example, when an ignition key is turned on. Furthermore, the SRS control unit 27 selects all of the other electrode units 18 as electrode units for measuring voltage for failure judgment 18 which are different from the electrode unit for applying voltage for failure judgment 18, and the SRS control unit 27 measures voltages by these electrode units for measuring voltage for failure judgment 18. The SRS control unit 27 has a table which records allowable range of the voltages for each of the electrode units for measuring voltage for failure judgment 18. When the voltages measured by each of the electrode units for measuring voltage for failure judgment 18 are compared with the table, and in the case in which the voltage is out of the allowable range, the SRS control unit 27 judges that the electrode unit for measuring voltage for failure judgment 18 is malfunctioning. On the other hand, in the case in which none of the electrode units for measuring voltage for failure judgment 18 are out of the allowable range, the SRS control unit 27 will make a failure judgment that there is no failure. Moreover, the above-mentioned failure judgment will be made at least twice by changing the electrode unit for applying voltage for failure judgment 18, that is, by changing the above-mentioned electrode unit for applying voltage for failure judgment 18 to one of the electrode units for measuring voltage for failure judgment 18 at the next failure judgment. In the case in which the judgment is made in these failure judgments that one of the electrode units for measuring voltage for failure judgment 18 is malfunctioning, then the SRS control unit 27 will display an indication showing that the failure happened, for example, on an instrument panel. In addition, the SRS control unit 27 will judge the above-mentioned type of collision and the degree of collision force after canceling the measurements of the failed electrode units for measuring voltage for failure judgment 18. Moreover, in a normal operating state after turning on the ignition key, in the case in which a measurement output for temperature compensation indicates impossible and abnormal temperature continuously, based on this, the SRS control unit 27 can make a failure judgment that the electrode unit 18 is malfunctioning.

Moreover, so that a collision occurring during executing of the above-mentioned temperature compensation and failure judgment will not affect the results of the type of collision and the degree of collision force, the voltage levels to be measured by the electrode units 18 at the temperature compensation and the failure judgment are made duly smaller than the voltage levels to be measured by the electrode units 18 in the collision.

As explained above, in the collision detection device for a vehicle 1 of the present invention, the collision detection sensor for a vehicle 10 includes a plurality of electrode units 18 which are provided with a space therebetween on the piezoelectric film which is flat. By adopting this configuration, in addition to the pressures applied on positions where the electrode units 18 are provided, the pressures applied on positions where the electrode units 18 are not provided can also be detected by the electrode units 18 which are located away from a compressed part on the piezoelectric film 15, by the stress transferring from the compressed part along the surface of the piezoelectric film 15. Then, by analyzing the voltages of each of the electrode unit 18 immediately and completely, it is possible to determine the type of collision and the magnitude of collision force and to make a judgment of collision for specifying the type of collision. Furthermore, based on the judgment of collision, it is possible to make suitable selection of safety devices for collision that should be activated. Therefore, since it is not necessary to provide many piezoelectric films 15 in order, and since the number of the electrode units 18 can be reduced, manufacturing cost can be reduced.

In addition, in a state in which the SRS control unit 27 applies the predetermined voltage to one of the electrode units 18 on the piezoelectric film 15, a local deformation is produced on the piezoelectric film 15, and a stress caused by the local deformation is transferred along the surface of the piezoelectric film 15, and the stress can be detected by other electrode units 18 located away from the above-mentioned one electrode unit 18. Furthermore, since the voltages measured by the above-mentioned other electrode units 18 varies depending on the temperature, in contrast, it is possible to estimate the temperature based on the voltages measured by the above-mentioned other electrode units 18, and to perform temperature compensation based on the estimated temperature. In addition, since the voltages measured by the above-mentioned other electrode units 18 should be held within a predetermined range, it is possible to make a failure judgment (whether the condition is normal or abnormal) based on the voltages whether it is kept within the predetermined range or not. Therefore, also in the point that these temperature compensation and failure judgments can be performed without using other sensors such as a temperature sensor, it can be said that the manufacturing cost can be reduced.

Moreover, in each embodiment explained above, the explanation has been made for the case in which the collision detection sensor for a vehicle 10 is provided on the inner surface of the front bumper face 12, and mainly detects a front collision. However, of course, it is possible, for example, to provide the collision detection sensor for a vehicle 10 on an inner surface of a rear bumper and to mainly detect a rear collision, or to provide the collision detection sensor for a vehicle 10 on an inner surface of external plates of doors and to mainly detect a side collision.

In addition, in each embodiment explained above, the explanation has been made for the case in which the electrode units 18 are arranged along the length direction of the piezoelectric film 15; however, it is possible to arrange the electrode units 18 along both of the length direction and the width direction (up and down direction) in a matrix and to measure the voltages by each electrode unit 18.

Furthermore, in each embodiment explained above, the signal conditioner 25 has a role of transferring low noise signals to the SRS control unit 27 by increasing the signal intensity; however, the signal conditioner 25 may have functions, etc., to make some signal processing in the signal conditioner 25 and then to make a judgment whether the collision is with a pedestrian or with an object. In this case, the signals from the signal conditioner 25 to the SRS control unit 27 may employ either analog signals or digital signals.

In addition, it is possible to adopt a configuration to process all outputs from each electrode unit 18 by single signal conditioner 25 as shown in FIG. 1; however, the signal conditioner 25 may be independently provided for each of the electrode units 18.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A collision detection device for a vehicle, comprising:
    a collision detection sensor for the vehicle, which includes a single piezoelectric film which is flat, a plurality of pairs of electrodes which sandwich the piezoelectric film and measure voltages between the electrodes, and spaces provided between the plurality of pairs of electrodes; and
    a controller which detects collision of the vehicle based on detected results by the collision detection sensor for the vehicle;
    wherein the controller estimates collision forces at the spaces by calculating a line which smoothly connects measurements at the plurality of pairs of electrodes.

2. The collision detection device for a vehicle according to claim 1, wherein
    the controller determines a type of collision and a magnitude of collision force based on voltages measured by the plurality of pairs of electrodes.

3. The collision detection device for a vehicle according to claim 1, wherein
    three or more pairs of electrodes are provided linearly.

4. The collision detection device for a vehicle according to claim 1, wherein
    the collision detection sensor is provided in a front bumper face of the vehicle, and
    wherein the collision detection sensor is provided as a sensor for detecting a collision with a pedestrian and as a sensor for controlling operation of an air bag.

5. The collision detection device for a vehicle according to claim 1, wherein
    the plurality of pairs of electrodes include:
        a first pair of electrodes, and
        a second pair of electrodes; and
    wherein in a state in which a predetermined voltage is applied to the first pair of electrodes, the controller performs at least one of temperature compensation and failure judgment based on detected results of the second pair of electrodes.

* * * * *